United States Patent [19]
Bekele

[11] Patent Number: 5,482,770
[45] Date of Patent: Jan. 9, 1996

[54] HIGHLY ORIENTED MULTILAYER FILM

[75] Inventor: Solomon Bekele, Taylors, S.C.

[73] Assignee: W. R. Grace & Co.-Conn., Duncan, S.C.

[21] Appl. No.: 216,201

[22] Filed: Mar. 22, 1994

Related U.S. Application Data

[63] Continuation-in-part of Ser. No. 970,896, Nov. 3, 1992.
[51] Int. Cl.⁶ ........................................... B32B 5/16
[52] U.S. Cl. .................... 428/339; 428/36.7; 428/474.4; 428/483; 428/500; 428/516; 428/520
[58] Field of Search ........................ 428/516, 500, 428/36.7, 474.4, 483, 520, 339

[56] References Cited

U.S. PATENT DOCUMENTS

| | | |
|---|---|---|
| 3,560,325 | 2/1971 | Sogi et al. |
| 4,501,797 | 2/1985 | Super et al. ............................ 428/349 |
| 4,501,798 | 2/1985 | Koschak et al. ...................... 428/475.5 |
| 4,640,852 | 3/1987 | Ossian ................................... 428/354 |
| 4,650,721 | 3/1987 | Ashcraft et al. ....................... 428/516 |
| 4,684,573 | 8/1987 | Mueller et al. ........................ 428/349 |
| 5,004,647 | 4/1991 | Shah ...................................... 428/516 |

Primary Examiner—Edith Buffalow
Attorney, Agent, or Firm—Rupert B. Hurley, Jr.; Mark B. Quatt

[57] ABSTRACT

An oriented multilayer film comprises a barrier layer of polymerized ethylene vinyl alcohol, and an orientation-compatible polymeric layer having a modulus of at least about $4\times10^4$ psi. The a barrier layer occupies from about 2 to 15 volume percent of the oriented multilayer film, and has a thickness of from about 0.01 to 0.75 mils. The polymerized ethylene vinyl alcohol has an ethylene content of from about 38 to 48 weight percent. The orientation compatible layer has a thickness of from about 0.49 to 4.5 mils. The multilayer film is oriented at a temperature of from about 165° F. to 212° F., has an orientation ratio greater than 9, an oxygen permeability at 0% relative humidity of from about 1 and 6 $cm^3$-mil/day-$m^2$-atm, and a total thickness of from about 0.5 to 5 mils.

23 Claims, 1 Drawing Sheet

HIGHLY ORIENTED MULTILAYER FILM

This application is a continuation-in-part application of U.S. Ser. No. 07/970,896, to S. BEKELE, the entirety of which is hereby incorporated by reference.

BACKGROUND OF THE INVENTION

1. Field of the Invention

The present invention relates to multilayer films containing an oxygen barrier, and particularly to such multilayer films which are chlorine-free, and have an oxygen barrier layer comprising polymerized ethylene vinyl alcohol. The present invention also relates to processes for making such multilayer films.

2. Description of Related Art

In the packaging and delivery of certain food products, such as cheese, pork, smoked and processed meats, and particularly fresh red meat, there exists the need to protect the meat for a period of time from when it is first butchered until it is used by the consumer. In particular, the most pertinent requirement for protecting fresh red meat is long term protection against oxygen, because oxygen promotes microbial degradation in such meats.

Polyvinylidene chloride, also referred to as "PVDC" or "saran", has been used as a sheet wrapping material or film, for preventing the passage of oxygen to the product being packaged. However, the elimination of chlorine in such packaging materials is desirable for a number of reasons, including potentially adverse environmental impact from the production and disposal of such chlorine-containing packaging materials.

Ethylene vinyl alcohol, often abbreviated "EVOH", is an alternative, chlorine-free composition exhibiting effective oxygen barrier characteristics. EVOH, however, loses its oxygen barrier properties when subjected to moisture, and, as would be expected, fresh red meats and similar food products contain high amounts of moisture which in turn tend to degrade the otherwise useful oxygen barrier properties of EVOH. Accordingly, the use of EVOH in the packaging of fresh red meat preferably includes a moisture barrier between the meat and the EVOH, to prevent the moisture from affecting the oxygen barrier characteristics of the EVOH in the film.

In addition to providing an oxygen barrier in the packaging of meats, etc., it is also preferred that the packaging material, especially packaging films, have satisfactory physical strength, to resist abuse to which the packaged product is subjected. Olefin products such as polypropylene and polyethylene can provide sheet materials having excellent strength characteristics. However, these olefins do not act as barriers to oxygen, i.e., they exhibit high oxygen transmission rates.

It is also desirable that packaging films for meats, etc., are heat-shrinkable, i.e., that the films are compatible with heat shrinking processes used in the packaging process. As is known to those familiar with heat-shrinkable packaging materials, and processes for using same, the term "orientation" refers to various deformation processes, i.e., "stretching", carried out on plastic film materials during their manufacture. The viscous and elastic properties of most thermoplastic polymers enable those polymers to recover from deformation, i.e., "remember" both the nature of the orientation and the temperature at which the orientation takes place. As a result, a plastic material oriented at a specific deformation temperature (e.g., 200° F.), and thereafter cooled to ambient or working temperatures, will, if later reheated to a temperature approaching the deformation temperature, have a tendency to return to its pre-oriented state at that temperature. Since the orientation is an expansion process, then the recovery will be a shrinking process. Thus, a further desirable property of an oxygen barrier packaging film is that any orientation occur at a relatively low temperature, with subsequent shrinking also occurring at that relatively low temperature.

Furthermore, packagers prefer to carry out the heat-shrink process at temperatures well below those at which red meat would start to cook. Thus, the lower the temperature at which a film can be oriented, the correspondingly lower temperature at which the film can be heat-shrunk, and the greater advantage the film offers for the packaging of fresh red meat. Additionally, the greater the degree to which a film can be oriented, the greater the degree to which the film will shrink. Furthermore, films which have a greater shrink potential have greater utility.

Therefore, the need exists for a chlorine-free, heat-shrinkable plastic film capable of maintaining oxygen barrier characteristics in the presence of reasonable amounts of moisture, capable of being oriented at an orientation ratio of greater than 9×1 at a temperature at or below 212° F.

SUMMARY OF THE INVENTION

It has been discovered that by coupling an extruded layer of polymerized ethylene vinyl alcohol (EVOH) with an extruded layer of a relatively high modulus, orientation-compatible layer, i.e., a layer having a modulus of at least $4 \times 10^4$ psi., an extruded tape comprising a layer of EVOH can be drawn at a relatively low temperature, i.e., from about 165° F. to 212° F., at a relatively high orientation ratio, i.e., an orientation ratio of at least 9×1, e.g., at least 3× in the machine direction and 3× in the transverse direction. The orientation-compatible layer is referred to as "orientation compatible" because it has a modulus high enough that it permits the relatively high amount of continuous orientation of the EVOH layer at the relatively low temperature, without breaking. In this manner, multilayer films can be provided, which contain an EVOH oxygen barrier layer, and which exhibit relatively high free shrink at relatively low temperature. This, in turn, enables the advantageous low-temperature use of a chlorine-free shrink film for the packaging of heat-sensitive foods, such as fresh red meat.

The present invention is directed to a multilayer film, comprising a barrier layer and an orientation-compatible polymeric layer. The barrier layer has a thickness of from about 0.01 to 0.75 mils, and comprises EVOH having an ethylene content of from about 34 to 60 weight percent. The orientation-compatible polymeric layer has a modulus of at least about $4 \times 10^4$ psi., i.e, greater than or equal to about $4 \times 10^4$ psi. The multilayer film has an orientation ratio greater than 9, the orientation having been carried out at a temperature of from about 165° F. to 212° F.; an oxygen permeability at 0% relative humidity of from about 0.1 and 6 $cm^3$-mil/day-$m^2$-atm; and a total thickness of the at least one orientation-compatible layer is from about 0.49 to 4.5 mils. The barrier layer occupies from about 2 to 15 volume percent of the multilayer film, and the multilayer film has a thickness of from about 0.5 to 5 mils.

Alternatively, the present invention is directed to a multilayer film, comprising a barrier layer and an orientation-compatible polymeric layer. The barrier layer has a thickness of from about 0.01 to 0.75 mils, and comprises EVOH having an ethylene content of from about 34 to 60 weight percent. The orientation-compatible polymeric layer has a modulus of at least about $4\times10^4$ psi; a shrink value, at 185° F., of at least 20% in a machine direction and at least 20% in a transverse direction, and an oxygen permeability at 0% relative humidity of from about 0.1 and 6 cm³-mil/day-m²-atm.; and, a total thickness of the at least one orientation-compatible layer is from about 0.49 to 4.5 mils. The barrier layer occupies from about 2 to 15 volume percent of the multilayer film, and the multilayer film has a total thickness of from about 0.5 to 5 mils.

The present invention is also directed to a process for making an oriented multilayer film, comprising the steps of: (1) extruding and quenching a tape comprising a barrier composition and an orientation-compatible composition; and (2) orienting the tape at an orientation ratio of from about 9 to 20 and at a temperature of from about 165° F. to about 212° F. so that a multilayer film, having a barrier layer and at least one orientation-compatible layer, is formed. The selection and proportioning of the compositions, and the remaining process parameters, are carried out so that the resulting multilayer film: has a barrier layer having a thickness of from about 0.01 to 0.75 mils, the barrier layer comprising polymerized ethylene vinyl alcohol having an ethylene content of from about 34 to 60 weight percent, the barrier layer occupying from about 2 to 15 volume percent of the oriented multilayer film; has at least one orientation compatible layer having a total thickness of said at least one orientation-compatible layer of from about 0.49 to 4.5 mils, and a modulus of at least about $4\times10^4$ psi; has an oxygen permeability at 0% relative humidity of from about 0.1 and 6 cm³-mil/day-m²-atm; and has a thickness of from about 0.5 to 5 mils.

The process can utilize a single coextrusion in which all of the film layers are simultaneously coextruded, or a process in which a substrate is first extruded and quenched, followed by the step of coating the substrate. Optionally, the substrate can be irradiated before the coating step.

Using the same general extrusion and orientation steps, the process can be carried out to result in the alternative multilayer film described above, i.e., having a free shrink of at least 20% in the machine direction and at least 20% in the axial direction.

BRIEF DESCRIPTION OF THE DRAWINGS

Two embodiments of the present invention are more particularly described with reference to the accompanying non-limiting FIGS. 1 and 2, both of which are directed to preferred embodiments of the multilayer film of the present invention, wherein.

DETAILED DESCRIPTION OF THE INVENTION

Figure 1:
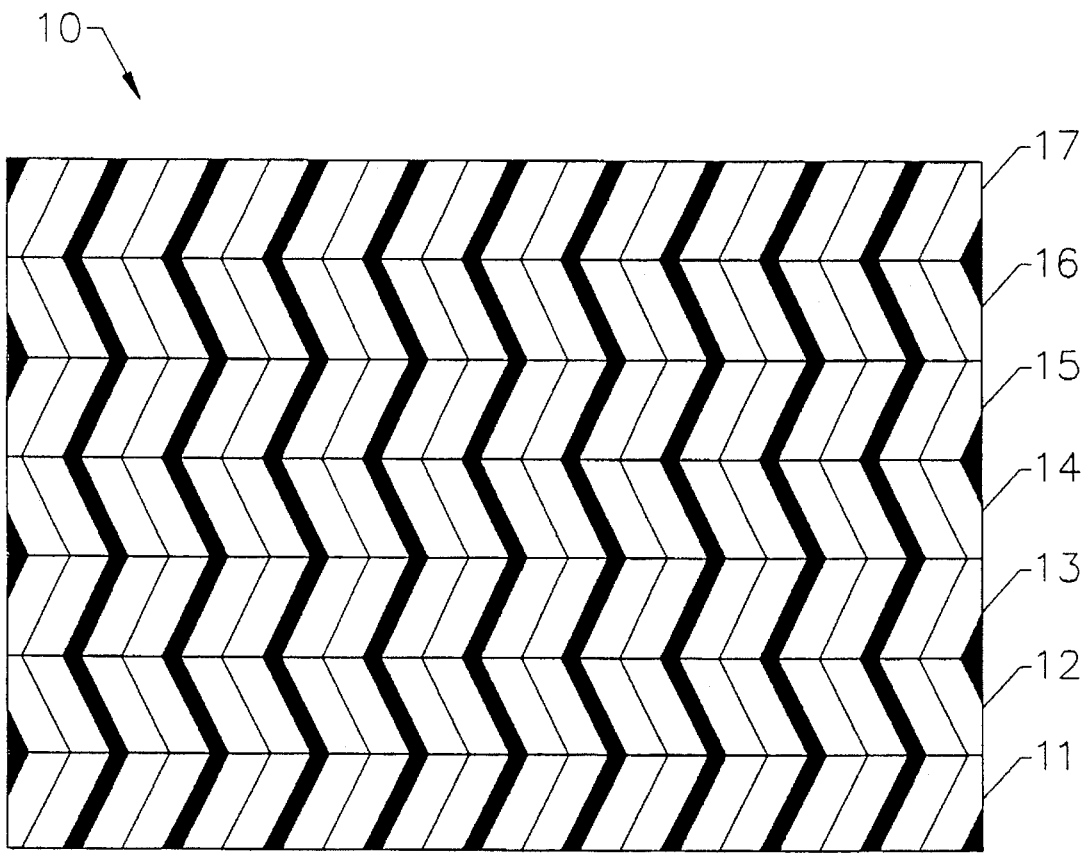
FIG. 1 is a schematic cross-sectional view of a preferred embodiment of an oriented multilayer heat shrinkable film according to the present invention.

As used herein, the term "extrusion" includes the extrusion of a mono-layer, coextrusion of a plurality of layers, extrusion coating, and any combination of all of these.

As used herein, the term "core", and the phrase "core layer", as applied to multilayer films, refer to any internal film layer having each face directly adhered to another layer, and which has a functional purpose other than serving as an adhesive or compatibilizer for adhering two layers to one another. Usually, the core layer or layers provide the multilayer film with a desired level of strength, i.e., modulus.

As used herein, the phrase "barrier layer" refers to a film layer comprising a composition, such as ethylene vinyl alcohol, known to serve as an oxygen barrier.

As used herein, the phrase "sealant layer" refers to an outer film layer which is capable of being heat sealed to another film layer.

As used herein, the phrase "internal layer" refers to any film having its two principal surfaces with other layers of the multilayer film.

As used herein, the phrase "outer layer" refers to any film layer, of a multilayer film, having only one of its principal surfaces directly adhered to another layer of the film.

As used herein, the phrase "tie layer" refers to any internal layer, of a multilayer film, which is present for the principal purpose of adhering two layers to one another.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained oriented material to its orientation temperature, heat shrinkage is produced almost to the original unstretched, i.e., pre-oriented dimensions. More particularly, the term "oriented", as used herein, refers to oriented films, wherein the orientation can be produced in one or more of a variety of manners.

As used herein, the phrase "the at least one orientation-compatible layer having a thickness" refers to the sum of the thicknesses of all the orientation-compatible layers of the multilayer film under consideration.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, the term "coextrusion" refers to the process of extruding two or more materials through a single die with two or more orifices arranged so that the extrudates merge and weld together into a laminar structure before chilling, i.e., quenching. Each material is fed to the die from a separate extruder, but the orifices may be arranged so that each extruder supplies two or more plies of the same material. Coextrusion can be employed in film blowing, free film extrusion, and extrusion coating processes. The advantage of coextrusion is that each ply of the laminate imparts a desired characteristic property, such as stiffness, heat-sealability, impermeability or resistance to some environment, all of which properties would be impossible to attain with any single material.

As used herein, the phrase "directly adhered", as applied to film layers, is defined as adhesion of the subject film layer to the object film layer, without a tie layer, adhesive, or other layer therebetween.

As used herein, the term "monomer" refers to a relatively simple compound, usually containing carbon and of low molecular weight, which can react to form a polymer by combination with itself or with other similar molecules or compounds.

As used herein, the term "comonomer" refers to a monomer which is mixed with a different monomer for a polymerization reaction, the result of which is a copolymer.

As used herein, the term "polymer" is inclusive of homopolymers, copolymers, terpolymers and block, graft or random polymers.

As used herein, the term "copolymer" refers to polymers formed by the polymerization reaction of at least two different monomers. For example, the term "copolymer" includes the copolymerization reaction product of ethylene and an α-olefin, such as 1-hexene. However, the term "copolymer" is also inclusive of, for example, the copolymerization of a mixture of ethylene, propylene, 1-hexene, and 1-octene.

As used herein, the term "copolymerization" refers to the simultaneous polymerization of two or more monomers.

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Such polymers contain several types of chain lengths and comonomer percentages.

As used herein, the phrase "homogeneous polymer" refers to polymerization reaction products of relatively narrow molecular weight distribution and relatively narrow composition distribution. Such polymers exhibit a relatively even sequencing of comonomers within a chain, the mirroring of sequence distribution in all chains, and the similarity of length of all chains, and are typically prepared using metallocene, or other single-site type catalysis.

As used herein, a copolymer identified in terms of a plurality of monomers, e.g., "propylene/ethylene copolymer", refers to a copolymer in which the first listed monomer copolymerizes in a higher weight percent than the second listed monomer, and, for copolymers which are terpolymers, the first monomer copolymerizes in a higher weight percent than the second monomer, and the second monomer copolymerizes in a higher weight percent than the third monomer, etc.

As used herein, the term "tape" refers to a relatively thick precursor of a film, which is extruded and thereafter oriented and thinned and oriented by blowing, to impart transverse orientation, and/or stretching, to impart orientation in the machine direction, while the tape is at an elevated temperature.

As used herein, the "melt index" of a polymer is the amount, in grams, of a thermoplastic resin which can be forced through an orifice of 0.0825 inch diameter when subjected to a force of 2160 grams in ten minutes at a specified temperature, e.g., 190° C. for many polymers. The test is performed by an extrusion rheometer described in ASTM D 1238.

As used herein, the term "modulus" refers to the ratio of the change in force to the change in elongation in the straight line portion of an Instron Tensile Testing curve. Modulus is measured by ASTM D 882—Method A. For example, EVOH has a modulus of about $29.9 \times 10^4$ psi., while EVA has a modulus of about $0.42$–$2 \times 10^4$ psi., and LLDPE has a modulus of about $8 \times 10^4$ psi.

As used herein, the phrase "a polymeric layer having a modulus of at least about $4 \times 10^4$ psi", refers to a film layer comprising a single polymer having a modulus of at least about $4 \times 10^4$ psi, or a film layer comprising a blend of polymers which together have a modulus of at least about $4 \times 10^4$ psi.

As used herein, the phrase "orientation compatible polymer" refers to a polymer or blend of polymers, which is compatible in modulus with orienting EVOH at least 9×, at 160–212F.

As used herein, the phrase "polar functional group" refers to at least one member selected from the group consisting of acid, anhydride, ether, ester, amine, urethane, and alcohol.

As used herein, the term "polyolefin" refers to any polymerized olefin, which can be linear, branched, cyclic, aliphatic, aromatic, substituted, or unsubstituted. polyolefin As used herein, the phrase "skin layer" refers to an outermost layer of a multilayer film in packaging a product, this skin layer being subject to abuse.

As used herein, the phrase "sealant layer" refers to an innermost film layer of a multilayer film in a product package, this sealant layer often being sealed to itself, and frequently serving as a food contact layer in the packaging of foods, especially meats.

As used herein, "free shrink" is measured according to ASTM D 2734, a test known to those of skill in the film art.

As used herein, "oxygen transmission rate", also referred to as "OTR" and "oxygen permeability", is measured according to ASTM D 3985, a test known to those of skill in the film art.

As used herein, the phrase "low density polyethylene", i.e., "LDPE", refers to ethylene alpha olefin copolymers having a density of from about 0.91 to about 0.925.

As used herein, the phrase "linear low density polyethylene", i.e., "LLDPE", refers to ethylene alpha-olefin copolymers having a density of from about 0.915 to 0.94.

As used herein, the phrase "linear medium density polyethylene", i.e., "LMDPE", refers to ethylene alpha-olefin copolymers having a density of from about 0.925 to 0.94.

As used herein, the phrase "high density polyethylene", i.e., "HDPE", refers to ethylene alpha-olefin copolymers having a density of greater than about 0.94.

As used herein, "EVOH" refers to ethylene vinyl alcohol copolymer. EVOH includes saponified or hydrolyzed ethylene vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably at least 50% and more preferably at least 85%.

As known to those familiar with the manufacture of such films, the orientation ratio is the multiplication product of the extent to which the plastic film material is expanded in several directions, usually two directions perpendicular to one another. These directions are frequently referred to as the machine direction ("MD") which is the direction in which the extruded material is formed, and the transverse direction ("TD") which is the direction transverse or perpendicular to the machine direction. The degree of orientation is also referred to as the orientation ratio, or sometimes as the "racking ratio".

In general, the modulus of the orientation-compatible polymeric layer is greater than about $4 \times 10^4$ psi. Preferably, the modulus of the orientation-compatible polymeric layer is from about $4 \times 10^4$ psi to $20 \times 10^5$ psi. Still more preferably, the modulus of the orientation-compatible polymeric layer is from about $4 \times 10^4$ psi to $20 \times 10^4$ psi.

Although the orientation-compatible polymeric layer can, in general, comprise any polymer having the requisite modulus, preferably the orientation-compatible layer comprises a polymer having a polar functional group. The polar functional group comprises at least one member selected from the group consisting of acid, anhydride, ether, ester, amine, urethane, and alcohol. Preferably, the polymer comprising the polar functional group comprises at least one member selected from the group consisting of polyamide homopolymer, polyamide copolymer, polyester homopolymer, polyester copolymer, and anhydride grafted linear low density polyethylene.

More preferably, the orientation-compatible polymeric layer comprises at least one member selected from the group consisting of anhydride grafted linear low density polyethylene, maleic anhydride-grafted ethylene vinyl acetate copolymer. Furthermore, the orientation-compatible polymeric layer can comprise a homogeneous ethylene alpha-olefin copolymer.

In general, the barrier layer of the multilayer film according to the present invention comprises an EVOH polymer comprising from about 34 to 60 weight percent ethylene. Preferably, the EVOH polymer of the barrier layer comprises from about 38 to 48 weight percent ethylene. Still more preferably, the EVOH polymer in the barrier layer comprises about 44 weight percent ethylene. Most preferably, the barrier layer is made from 100 weight percent EVOH comprising 44 weight percent ethylene.

Although the orientation-compatible polymeric layer can be directly adhered to the barrier layer, preferably, the multilayer film comprises at least one tie layer between the barrier layer and the orientation-compatible layer.

In general, the barrier layer in the multilayer film according to the present invention has an oxygen transmission rate of from about 0.1 to 6 cc-mil/day m$^2$ atm, preferably 0.3 to 3 cc-mil/day m$^2$ atm, and still more preferably, 0.7 to 2 cc-mil/day m$^2$ atm.

Figure 2:
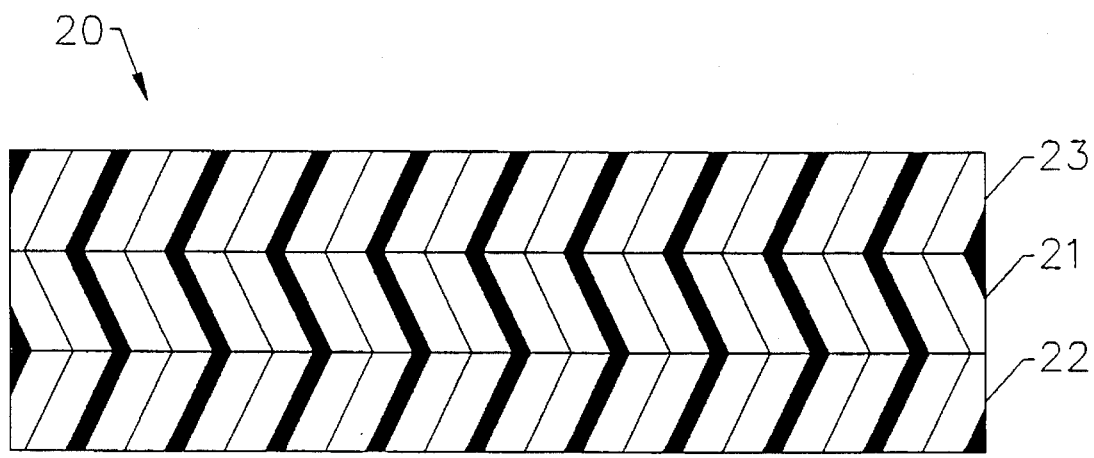
FIG. 2 is a schematic cross-sectional view of an alternative embodiment of an oriented, multilayer, heat-shrinkable film according to the present invention.

The multilayer film according to the present invention comprises a minimum of two layers, and preferably comprises from 5 or 7 layers, as illustrated in the preferred embodiments illustrated in FIGS. 1 and 2.

In general, first layer 11, of multilayer film 20 of FIG. 1, is a seal layer comprising a polyolefin. Preferably, first layer 11 comprises at least one member selected from the group consisting of polyolefin linear low density polyethylene and metallocene catalyzed ethylene based polyolefin. Still more preferably, first layer 11 comprises at least one member selected from the group consisting of a blend of ethylene vinyl acetate and linear low density polyethylene in which the amount by weight of ethylene vinyl acetate is greater than the amount by weight of linear low density polyethylene, and a blend of metallocene catalyzed ethylene-based polyolefin and ethylene vinyl acetate copolymer, in which the amount by weight of ethylene vinyl acetate is greater than the amount by weight of metallocene catalyzed ethylene-based polyolefin is greater than the amount by weight of ethylene vinyl acetate.

In general, second layer 12 is a core layer of multilayer film 10 illustrated in FIG. 1, and comprises a metallocene catalyzed ethylene-based polyolefin. Preferably, second layer 12 comprises a blend of metallocene catalyzed ethylene-based polyolefin and linear low density polyethylene in which the amount by weight of linear low density polyethylene is greater than the mount by weight of the metallocene catalyzed polyolefin.

In general, third layer 13 is a tie layer in multilayer film 10 illustrated in FIG. 1, and comprises at least one member selected from the group consisting of anhydride grafted ethylene vinyl acetate, maleic anhydride grafted ethylene vinyl acetate.

In general, fourth layer 14 is also a tie layer in multilayer film 10 illustrated in FIG. 1, and comprises at least one member selected from the group consisting of anhydride grafted ethylene vinyl acetate, and maleic anhydride grafted ethylene vinyl acetate.

In general, fifth layer 15, a barrier layer in multilayer film 10 illustrated in FIG. 1, comprises polymerized ethylene vinyl alcohol. Preferably, fifth layer 15 comprises polymerized ethylene vinyl alcohol comprising from about 34 to 60 weight percent ethylene, more preferably, ethylene vinyl alcohol comprising from about 38 to 48 weight percent ethylene, and, most preferably, about 44 weight percent ethylene.

In general, sixth layer 16 is a tie layer in multilayer film 10 illustrated in FIG. 1, and comprises at least one member selected from the group consisting of anhydride grafted ethylene vinyl acetate, maleic anhydride grafted ethylene vinyl acetate.

In general, seventh layer 17, a skin layer in multilayer film 10 illustrated in FIG. 1, comprises a polyolefin. Preferably, seventh layer 17 comprises at least one member selected from the group consisting of linear low density polyethylene, metallocene catalyzed ethylene-based polyolefin; still more preferably, seventh layer 17 comprises a blend of metallocene catalyzed ethylene-based polyolefin and linear low density polyethylene in which the amount by weight of linear low density polyolefin is greater than the amount by weight of the metallocene catalyzed polyolefin.

The seven-layer film of FIG. 1 can, optionally, comprise only two tie layers, i.e., omit sixth layer 16.

In FIG. 1, multilayer film 10 can be prepared via a substrate-coating process, in which the substrate comprises sealant layer 11, which contains linear low density polyethylene (LLDPE). The designation "linear" refers to the predominant orientation of the polymer chains, and the designation "low density" refers to the relatively low density of the material relative to other linear polyethylenes. In the preferred embodiment illustrated in FIG. 1, sealant layer 11 comprises a blend of an ethylene vinyl acetate copolymer (EVA) and LLDPE in which the weight percent of EVA is greater than the weight percent of LLDPE.

In FIG. 1, core layer 12 is a blend of LLDPE and EVA, in which the weight percent LLDPE is greater than the weight percent EVA, i.e., relative amounts reversed from the relative amounts of LLDPE and EVA in sealant layer 11. In films such as the multilayer film of the present invention, the LLDPE is referred to as the "bulk" polymer in the film, because it provides a substantial portion of the modulus of the multilayer film.

In FIG. 1, first tie layer 13 comprises polymerized ethylene vinyl acetate ("EVA"). EVA is known to be useful in tie layers, due to its generally favorable adhesive qualities.

Although the embodiment schematically illustrated in FIG. 1 has seven layers, those of skill in the art of packaging film manufacture know that in some circumstances it is most useful to first prepare the sealant layer 11, the core 12, and the first tie layer 13 as a substrate, followed by adhering a coating, i.e., additional layers 14, 15, 16, and 17, to the substrate. The advantage in initially preparing less than all of the layers of the multilayer film, in the form of a substrate, is that certain materials, and thus the layers formed from those materials, can be treated by techniques, such as irradiation, heat, or orientation, which ultimately provide the multilayer film with improved overall properties. Other materials, however, which may also add beneficial properties to the final film, but which may be damaged, degraded, or otherwise adversely affected by such treatment techniques, can thus be later added to the substrate, in the form of a coating upon the substrate.

For example, irradiation is often used to crosslink polymers and improve their mechanical strength. Some polymers, however, including polyvinylidene chloride, tend to discolor or degrade under irradiation. Thus, although such polymers are beneficially included in the final film, they are preferably not irradiated. Accordingly, by first preparing a substrate from materials which can be processed appropriately, e.g., with an irradiation treatment, and thereafter coating the substrate with materials which add beneficial properties, but which should not be subjected to such processes as, e.g., irradiation, an overall film can be produced that has the best combination of properties in the combination of layers therein.

Irradiation of the heat-shrinkable film includes irradiation by subjecting a tape and/or film to an energetic radiation treatment, such as corona discharge, plasma, flame, ultraviolet, X-ray, gamma ray, beta ray, and high energy electron treatment, which induce cross-linking between molecules of the irradiated material.

Radiation dosages are referred to herein in terms of the radiation unit "RAD", with one million RADS, also known as a megarad, being designated as "MR". A suitable radiation dosage of high energy electrons is in the range of up to about 12 MR, more preferably about 2 to about 9 MR. However, irradiation after orientation, regardless of structure, and performed at lower dosage levels, is also within the scope of the present invention.

Preferably, irradiation is carried out by an electron accelerator and the dosage level is determined by standard dosimetry methods. Irradiation is most preferably performed prior to orientation and, in the case of a Saran-containing barrier structure, prior to extrusion coating of the barrier component with the radiation-degradable Saran.

As further illustrated in FIG. 1, the layers other than the sealant 11, the core 12, and the first tie layer 13, make up the coating. The coating further comprises second tie layer 14, which is directly adhered to first tie layer 13, and which likewise preferably comprises EVA. The coating further comprises oxygen barrier layer 15, which, in turn, comprises polymerized ethylene vinyl alcohol. Polymerized ethylene vinyl alcohol is herein referred to as "EVOH". Oxygen barrier layer 15 is directly adhered to second tie layer 14.

Those of skill in the art of EVOH know that these polymers can be made from the copolymerization of a relatively wide range of weight percent ethylene monomer and vinyl alcohol monomer. EVOH polymers are thus often characterized by the percentage of ethylene units in the resulting copolymer, i.e., also referred to as the "ethylene fraction", which, of course, is a mole fraction. In the multilayer film of the present invention, the ethylene fraction can, in general, be from about 34 to 60 weight percent, preferably, from about 38 to 48 weight percent ethylene, and most preferably, about 44 weight percent ethylene. EVOH polymers are currently commercially available with ethylene fractions of from about 27% to 48%. In general, the higher the ethylene content of the EVOH, the easier the orientation but the lower the oxygen barrier properties of the layer. The higher the vinyl alcohol content of the EVOH, the higher the modulus, the more difficult the orientation, and the greater the oxygen barrier properties of the layer.

As is set forth hereinbelow in Table 1, several different the EVOH polymers used in Examples 1–7, these polymers being provided from different sources. The EVOHs provided by Evalca and were based on either 43% or 44% mole fraction of ethylene. These are designated in Table 1 as XEP-196 and XEP-208 (43% mole fraction ethylene), and XEP-203 and XEP-204 (44% mole fraction ethylene).

To complete the structure illustrated in FIG. 1, third tie layer 16 is present on the EVOH layer 15, and helps to bind the EVOH layer to an LLDPE skin layer 17. In more preferred embodiments, the skin layer 17 comprises a composite of EVA and LLDPE in which the amount of EVA is greater than the amount by weight of LLDPE in a manner similar to the composition previously described for the sealant layer.

In a most preferred embodiment, the polyolefin layers include a new type of ethylene-based linear polymer. These polymers are produced using metallocene catalyst polymerization and are characterized by narrower or more homogeneous compositional properties such as molecular weight distribution, than are polymer resins produced by more conventional metallic catalyst systems. Conventional metallic catalyst polymerization systems have discrete composition differences which are manifested as different catalyst reaction sites. Each such site has a different reaction rate and selectivity. In contrast, metallocene catalyst systems are characterized by a single identifiable chemical type which has a singular rate and selectivity. Thus, the conventional metallic catalyst systems produce resins that reflect the differential character of the different catalyst sites. Alternatively and advantageously, metallocene catalyst systems produce polymer resins that reflect the single type of catalytic site. It is known, to those skilled in the polymer art, however, that at least some previously available ethylene-based linear polymers approximated the physical and compositional properties achieved by the metallocene catalyzed polyolefins. Stated differently, traditional metallic catalyzed polymerization processes operating at low reaction rates can produce relatively homogeneous resins that compare favorably with the homogeneity of metallocene catalyzed resins. An example of such are the resins sold under the trade name TAFMER by Mitsui Petrochemical Americas, Ltd., 250 Park Avenue, Suite 950, New York, N.Y., 10177.

As is set forth hereinbelow in Table 1, the metallocene catalyzed ethylene-based polyolefins included a metallocene catalyzed resin known as SLP 4012, and an ethylene-hexene copolymer having a melt index of 2.5 and a density of 0.885 g/cc, obtained from Exxon Chemical Company of Baytown, Tex.

Racking speeds were accomplished at between about 27 and 31 feet per minute, which is relatively high, considering the total thickness of the tape and the amount of linear polyolefin in the structure.

In another embodiment, but one which results in a film as schematically illustrated by FIG. 1, the heat shrinkable film of the present invention is not formed as a substrate and a coating, but rather is coextruded, i.e., without a coating, in the structure shown in FIG. 1, i.e., all seven layers are simultaneously coextruded. As in the case of the substrate and coating embodiment, the layers can have all of the compositions just described. In alternative embodiments, the LLDPE can also be mixed with or replaced by another polyolefin such as polypropylene.

In yet another embodiment, the heat-shrinkable film of the present invention can be described on the basis of its functional benefits. Such a film is schematically illustrated in FIG. 2. FIG. 2 illustrates a composite film formed of an EVOH layer 21 bordered adjacent both surfaces by respective layers 22 and 23 of a polyolefin. The composite film has an orientation ratio greater than 9 and an oxygen permeability at 0% relative humidity (RH) of from about 3.8 and 4.4 $cm^3$-mil/day/$m^2$-atm. It will be understood by those familiar with the oxygen barrier capabilities of such heat shrink films that these are one of the appropriate units used to describe the oxygen transmission characteristics which, of course, is another way of describing the oxygen barrier characteristics.

Although FIG. 2 illustrates such an embodiment broadly, it will be understood that this embodiment can also incorporate the additional tie layers and core layers illustrated in FIG. 1 and described with respect to that embodiment.

In one embodiment, the process according to the present invention provides coextruding a substrate, followed by coating the substrate with one or more additional layers. The substrate comprises a sealant layer containing linear low density polyethylene, a predominantly linear low density polyethylene core layer upon the sealant, and a first tie layer on the core. The coating comprises a second tie layer adjacent the first tie layer, an ethylene vinyl alcohol layer adjacent the second tie layer, a third tie layer on the ethylene vinyl alcohol layer, and a skin layer containing linear low density polyethylene on the third tie layer.

In another embodiment, the invention comprises a method of forming a heat shrinkable film with the relatively high oxygen barrier properties and the relatively high orientation ratio, as set forth above. In a first embodiment, the method comprises coextruding a substrate comprising a sealant layer containing LLDPE, a predominantly LLDPE core upon the sealant, and a first tie layer on the core. As just stated, the substrate materials are coextruded, and in preferred embodiments have the characteristics just described with respect to the structure shown in FIG. 1.

As a next step, the substrate is irradiated to crosslink the polymers in the substrate. The irradiation is selected to appropriately crosslink the materials without causing other chemical or physical changes. In preferred embodiments it comprises an irradiation equivalent of between about 4 and 5 megarads. As known to those familiar with the use of ionizing radiation, a rad is a unit of absorbed energy that corresponds to 100 ergs per gram of material.

After irradiation, the substrate is coated with a second tie layer adjacent the core tie layer, an EVOH layer adjacent the second tie layer, a third tie layer on the EVOH layer, and the skin layer containing LLDPE on the third tie layer. These are likewise preferably of the compositions just described above with respect to FIG. 1.

The next step in the method is that of orienting the coated substrate. In turn, the orientation step comprises maintaining the coated substrate after extrusion at temperature of between about 165° F. to 212° F. preferably 185° F. and 210° F. most preferably about 205° F. During the orientation, the coated substrate is preferably expanded in both the machine direction (i.e., stretch) and the transverse direction (i.e., blown), followed by cooling and winding the expanded coated substrate.

Because of the relatively high amount of relatively high modulus polymer in combination with EVOH, the step of orienting the coated substrate can comprise orienting at an orientation ratio of at least 9, preferably, of from about 9 to 20, more preferably, of from about 9 to 15, and still more preferably, of from about 9 to 12.

In another embodiment, and one made possible by the elimination of chlorine in PVDC from the film of the present invention, the entire structure shown in FIG. 1 can be simultaneously coextruded as the sealant layer with the core layer, the first and second tie layers, the EVOH layer, the third tie layer, and the skin. All of these layers have, in preferred embodiments, the relative compositions previously described with respect to the layers shown in FIG. 1, and can be oriented at the ratios described above, at the temperatures as set forth above.

The advantage of coextruding all the layers is the elimination of the steps of handling the substrate while applying the coating layers among other manufacturing efficiencies. Because of the absence of PVDC, the coextruded, fully complete film can be irradiated for crosslinking purposes after extrusion, rather than between extrusion and coating.

As in the alternate embodiment of the method, the method of forming the heat shrinkable film can further comprise the step of orienting the coextruded film, and the orientation step similarly comprises maintaining the film after extrusion at a temperature of between about 185° and 210° F. expanding the coextruded film in both the machine direction and the transverse direction (i.e., biaxial orientation), and cooling and winding the expanded coextruded film. Similarly, because of the unique structure of the film, it can be unexpectedly expanded at ratios greater than 8×1 and including ratios of between 8×1 and 12×1.

EXAMPLES 1–7

The films of Examples 1–7 were prepared by coextruding and quenching a 3-layer tape, irradiating the tape, and thereafter coating the tape with a four-layer coating, using equipment and process steps conventional to those of skill in this art. The core and sealant layers that form the substrate were extruded at appropriate temperatures; e.g., approximately 350°–400° F., for the composite films of the present invention. The substrate was quenched at about 50° F. and then irradiated. The coating layers were then applied by extrusion, at temperatures of about 330°–430° F. and again quenched to about 50° F. The product was a flattened tube of composite film, referred to as the tape. The tape was then heated in a water bath to a temperature of between about 185° and 210° F. nipped (on rolls), and directed through an air ring. The air ring inflated the tape, while a terminal set of nip rolls drew it at a higher rate than it is initially fed. As a result, the air ring helped to expand the tape in the transverse direction into a tube while the terminal nip rolls expanded the tape in the machine direction. The terminal nip rolls also re-flattened the tubing, after which it was wound for use or other processing.

More particularly, a "3+4" substrate+coating multilayer film was prepared using a process in which a skin layer formed of a composite of 80% ethylene vinyl acetate copolymer with 20% of the metallocene catalyzed ethylene-based polyolefin; a core layer of 60% linear low density polyethylene and 40% metallocene catalyzed polyolefin; a first tie layer formed of a maleic anhydride grafted ethylene alpha-olefin copolymer such as the TYMOR™ 1203 supplied by Morton International; a second tie layer formed of the same material; a barrier layer of ethylene vinyl alcohol; a third tie layer of the previously recited material; and a skin layer formed of a composite of about 60% linear low density polyethylene and 40% metallocene catalyzed polyolefin. In the 3+4 multilayer film structure, the respective target thicknesses were 3 mils, 10 mils, 1.2 mils, 1.2 mils, 2.4 mils, 1.2 mils, and 7.5 mils, for a total thickness of 26.5 mils with a target tape width of 4.5 inches. The orientation ratios using various EVOHs are set forth in Table 1.

All of the materials evaluated showed a good rheology match both in substrate and coating coextrusions. The sequence of the process used was substrate extrusion, followed by coating, followed by irradiation to 3.5 MR, which is a slight exception to the standard barrier process.

Table I provides the racking ratio, i.e., orientation ratio, and the oxygen transmission rates, at 0%RH, for the multilayer films of Examples 1–7.

TABLE I

| Example No | EVOH (all are commercial 44% EVOH) | Racking Ratio (MD × TD) | Oxygen Transmission Rate cm²-mil/day-m²-atm 0% RH at 73° F. | 100% RH at 73° F. |
|---|---|---|---|---|
| 1 | Eval LC E105A | Would not orient | 2–2.4 | 20–24 |
| 2 | Eval OEP 171 | 2.67 × 3.72 (9.9) | 3.8–4.4 | 44–52 |
| 3 | Morton OEA-1 | 3.20 × 3.72 (11.9) | 1.8–3.8 | 16–22 |
| 4 | Eval XEP-196 | 3.33 × 3.75 (12.4) | 2.6 | 19.7 |
| 5 | Eval XEP-208 | | 2.6 | 19.7 |
| 6 | Evval XEP-203 | 3.52 × 3.64 (12.8) | 1.6–2.8 | 15.0–17.2 |
| 7 | Eval XEP-204 | 3.65 × 3.75 (13.7) | 2.0–2.9 | 15.7–17.8 |

Samples 1–3 were made in a formulation such as: 90%EVA10%LLDPE/70%LLDPE- 30%EVA/TIE//TIE/EVOH/TIE/84%EVA-16%HDPE. The reported values of the oxygen transmission rates at "0% RH", for Examples 4 and 5, are estimated values at 68° F. (20° C.) and 85% relative humidity (RH). The reported values for the oxygen transmission rates at "100% RH", for Examples 4 and 5 are estimated values at 68° F. and 100% RH.

As disclosed in Table 1, all of the EVOH compositions used were commercial 44% ethylene, and all were utilized in the multilayer film formulation as set forth in the paragraph immediately above. Examples 6 and 7 are particularly illustrative of the highly oriented multilayer film according to the present invention, oriented at a racking ratio of 12.8×1 to 13.7×1. These films maintained an acceptable oxygen transmission rate of between 1.6 and 2.9 at 0% relative humidity at 73° F. and 15.0 to 17.8 at 100% relative humidity at 73° F.

A number of the designations in the Table refer to commercial versions of ethylene vinyl alcohol. Eval LC-E105A is a 44% ethylene EVOH from EVALCA, 1001 Warrensville Road, Suite 201, Lisle, Ill., 60632; OEP-1 and OEA-2 are similarly modified 44% ethylene EVOH compositions from Morton International, 1275 Lake Ave., Woodstock, Ill.

EXAMPLES 8–16

Several six-layer multilayer films were prepared in a manner similar to the process described in Examples 1–7, except that the process used to make the films of Examples 8–16 was a coextrusion process, in which all six layers were simultaneously coextruded, rather than the substrate formation-substrate coating process utilized in Examples 1–7. The extrusion was carried out at 400° F. and quenching of the resulting tape (having thicknesses ranging from 18 to 30 mils, was carried out at 50° F. The films were thereafter irradiated with 4.5 Megarads (MR) of ionizing radiation, and oriented at an average orientation temperature of about 205° F. In general, the orientation was carried out in the manner as set forth above for Examples 1–7. The orientation temperature varied from 200° F. to 210° F. due to variations in the temperature of the water bath which heated the tape prior to orientation.

In each of the six-layer films of Examples 9–16, Layer #1, a seal layer of the six-layer film, comprised a blend of: (1) 80 weight percent ethylene vinyl acrylate (EVA) resin, containing 6% vinyl acrylate, and having a melt index of about 0.5, this EVA resin being known as PE 1651CS28 ethylene vinyl acetate copolymer resin being obtained from Rexene Products Company, of Dallas, Tex.; and (2) 20 weight percent SLP 4012 ethylene-butene copolymer resin having a density of 0.885 g/cc and a melt index of about 2.5, this resin being the product of a metallocene catalysis. This SLP 4012 ethylene-butene copolymer resin is produced using a metallocene catalyst, and has a density of 0.885 g/cc and a melt index of 2.5, and was obtained from Exxon Chemical Company of Baytown, Tex.

Layer #2, a core layer in each of the six-layer films of Examples 9–16, and Layer #6, a skin layer in each of the six-layer films of Examples 9–16, each comprised a blend of: (i) 60 weight percent Dowlex 2045 ethylene-octene resin having a density of about 0.918 g/cc, and a melt index of about 1.0; and (ii) 40 weight percent SLP4012, as described above.

Layer #3, a tie layer in each of the six-layer films of Examples 9–16, and Layer #5, also a tie layer in each of the six-layer films of Examples 9–16, were each composed of 100 weight percent a rubber modified anhydride-grafted LLDPE known as, TYMOR 1203, obtained from Morton International, of Chicago, Ill.

Layer #4, an oxygen barrier layer in each of the six-layer films of Examples 9–16, was composed of 100 weight percent polymerized ethylene vinyl alcohol having an ethylene content of 44 weight percent, referred to as EVAL LC-E105A, obtained from EVALCA, of 1001 Warrensville Road, Suite 201, Lisle, Ill., 60632.

Table II, below, provides data on the thickness, in mils, of each of the above-described layers of the multilayer films of Examples 9–16, the total thickness of the entire six-layer film, and the draw ratio used in the production of each of the films.

TABLE II

| Example No. | THICKNESS (MILS) | | | | | | Total Tape Thickness (mils) | Draw Ratio MD × TD |
|---|---|---|---|---|---|---|---|---|
| | layer #1 | layer #2 | layer #3 | layer #4 | layer #5 | layer #6 | | |
| 8 | 5.0 | 7.6 | 1.5 | 2.4 | 1.5 | 12.0 | 30 | 14 × 1 |
| 9 | 5.0 | 7.6 | 1.8 | 1.8 | 1.8 | 12.0 | 30 | 14.3 × 1 |
| 10 | 5.0 | 7.6 | 2.1 | 1.2 | 2.1 | 12.0 | 30 | 14.3 × 1 |
| 11 | 3.8 | 5.8 | 2.1 | 1.2 | 2.1 | 9.0 | 24 | 11.5 × 1 |
| 12 | 3.8 | 5.8 | 1.8 | 1.8 | 1.8 | 9.0 | 24 | 11.5 × 1 |
| 13 | 3.8 | 5.8 | 1.5 | 2.4 | 1.5 | 9.0 | 24 | 11.5 × 1 |
| 14 | 2.6 | 4.0 | 1.5 | 2.4 | 1.5 | 6.0 | 18 | would not orient |
| 15 | 2.6 | 4.0 | 1.8 | 1.8 | 1.8 | 6.0 | 18 | would not orient |
| 16 | 2.6 | 4.0 | 2.1 | 1.2 | 2.1 | 6.0 | 18 | 10.5 × 1 |

What is claimed is:

1. An oriented multilayer film, comprising:

(A) a barrier layer having a thickness of from about 0.01 to 0.75 mils, said barrier layer comprising EVOH having an ethylene content of from about 34 to 60 weight percent;

(B) at least one orientation-compatible polymeric layer having a modulus of at least about $4\times10^4$ psi;

wherein said multilayer film has:

an orientation ratio of at least 9 at a temperature of from about 165° F. to 212° F. and an oxygen permeability at 0% relative humidity of from about 0.1 and 6 cm$^3$-mil/day-m$^2$-atm;

a total thickness of said at least one orientation-compatible layer is from about 0.49 to 4.5 mils; and wherein the barrier layer occupies from about 2–15 volume percent of the oriented multilayer film, and the multilayer film has a thickness of from about 0.5–5 mils.

2. The multilayer film according to claim 1, wherein a ratio of a thickness of said orientation-compatible layer to the thickness of said barrier layer is at least about 5, and said orientation ratio is from about 9 to 20.

3. The multilayer film according to claim 2, wherein said ratio of said thickness of said orientation-compatible layer to said thickness of said barrier layer is from about 5 to 25, and said orientation ratio is from about 9 to 15.

4. The multilayer film according to claim 2, wherein said orientation-compatible polymeric layer has a modulus of from about $4\times10^4$ psi to $20\times10^5$ psi., and a ratio of a thickness of said orientation-compatible layer to the thickness of said barrier layer is from about 6 to 11, and orientation ratio is from about 9 to 15.

5. The multilayer film according to claim 1, wherein said EVOH polymer comprises from about 38 weight percent to 48 weight percent ethylene, said orientation-compatible polymeric layer has a modulus of from about $4\times10^4$ psi to $20\times10^4$ psi., and a ratio of a thickness of said orientation-compatible layer to the thickness of said barrier layer is from about 6 to 11, and said orientation ratio is from about 9 to 15.

6. The multilayer film according to claim 1, wherein said orientation-compatible polymeric layer comprises a polymer having a polar functional group comprising at least one member selected from the group consisting of acid, anhydride, ether, ester, amine, urethane, and alcohol.

7. The multilayer film according to claim 6, wherein said orientation-compatible polymeric layer comprises at least one member selected from the group consisting of polyamide homopolymer, polyamide copolymer, polyester homopolymer, polyester copolymer, and anhydride grafted linear low density polyethylene.

8. The multilayer film according to claim 7, wherein said orientation-compatible polymeric layer comprises at least one member selected from the group consisting of anhydride grafted linear low density polyethylene, maleic anhydride-grafted ethylene vinyl acetate copolymer.

9. The multilayer film according to claim 1, wherein the multilayer film is chlorine-free.

10. The multilayer film according to claim 1, wherein the multilayer film comprises:

a first layer comprising a polyolefin;

a second layer having a first side directly adhered to a said first outer layer, said second layer comprising a polyolefin;

a third layer, having a first side directly adhered to a second side of said second layer, said third layer comprising at least one anhydride grafted copolymer selected from the group of copolymers consisting of ethylene vinyl acetate, low density polyethylene, linear low density polyethylene, and high density polyethylene;

a fourth layer, having a first side directly adhered to a second side of said third layer, said fourth layer comprising polymerized ethylene vinyl alcohol; and a fifth layer, having a first side directly adhered to a second side of said fourth layer, said fifth layer comprising a polyolefin.

11. The multilayer film according to claim 1, wherein the multilayer film comprises:

a first layer comprising a polyolefin;

a second layer having a first side directly adhered to a said first outer layer, said second layer comprising a polyolefin;

a third layer, having a first side directly adhered to a second side of said second layer, said third layer comprising at least one anhydride grafted copolymer selected from the group of copolymers consisting of ethylene vinyl acetate, low density polyethylene, linear low density polyethylene, and high density polyethylene;

a fourth layer, having a first side directly adhered to a second side of said third layer, said fourth layer comprising at least one anhydride grafted copolymer selected from the group of copolymers consisting of ethylene vinyl acetate, low density polyethylene, linear low density polyethylene, and high density polyethylene;

a fifth layer, having a first side directly adhered to a second side of said fourth layer, said fifth layer comprising polymerized ethylene vinyl alcohol; and a sixth layer, having a first side directly adhered to a second side of said fourth layer, said sixth layer comprising a polyolefin.

12. The multilayer film according to claim 11, wherein:

said first layer comprises at least one member selected from the group consisting of linear low density polyethylene, and metallocene catalyzed ethylene based polyolefin;

said second layer comprises a metallocene catalyzed ethylene-based polyolefin;

said third layer comprises at least one member selected from the group consisting of a maleic anhydride grafted ethylene vinyl acetate and a maleic anhydride grafted linear low density polyethylene;

said fourth layer comprises at least one member selected from the group consisting of a maleic anhydride grafted ethylene vinyl acetate and a maleic anhydride grafted linear low density polyethylene;

said fifth layer comprises polymerized ethylene vinyl alcohol comprising from about 38 to 48 weight percent ethylene; and said sixth comprises at least one member selected from the group consisting of linear low density polyethylene, and metallocene catalyzed ethylene-based polyolefin.

13. The multilayer film according to claim 12, wherein:

said first layer comprises at least one member selected from the group consisting of a blend of ethylene vinyl acetate and linear low density polyethylene in which the amount by weight of ethylene vinyl acetate is greater than the amount by weight of linear low density polyethylene, and a blend of metallocene catalyzed ethylene-based polyolefin and ethylene vinyl acetate copolymer, in which the amount by weight of ethylene vinyl acetate is greater than the amount by weight of metallocene catalyzed ethylene-based polyolefin is greater than the amount by weight of ethylene vinyl acetate;

said second layer comprises a blend of metallocene catalyzed ethylene-based polyolefin and linear low density polyethylene in which the amount by weight of linear low density polyethylene is greater than the mount by weight of the metallocene catalyzed polyolefin;

said third layer comprises a maleic anhydride grafted linear low density polyethylene;

said fourth layer comprises a maleic anhydride grafted linear low density polyethylene;

said fifth layer comprises polymerized ethylene vinyl alcohol comprising about 44 weight percent ethylene; and said sixth layer comprises a blend of metallocene catalyzed ethylene-based polyolefin and linear low density polyethylene in which the amount by weight of linear low density polyolefin is greater than the amount by weight of the metallocene catalyzed polyolefin.

14. A multilayer film, comprising:

(A) a barrier layer having a thickness of from about 0.01 to 0.75 mils, said barrier layer comprising EVOH having an ethylene content of from about 34 to 60 weight percent;

(B) at least one orientation-compatible polymeric layer having a modulus of at least about $4 \times 10^4$ psi;

wherein:

said multilayer film has a shrink value, at 185° F. of at least 20% in a machine direction and at least 20% a transverse direction, and an oxygen permeability at 0% relative humidity of from about 0.1 and 6 $cm^3$-mil/day-$m^2$-atm;

a total thickness of said at least one orientation-compatible layer is from about 0.49 to 4.5 mils; and the barrier layer occupies from about 2 to 15 volume percent of the multilayer film, and the multilayer film has a thickness of from about 0.5 to 5 mils.

15. The multilayer film according to claim 11, wherein the film has a shrink value, at 185° F. of from about 20% to 50% in the machine direction, and from about 20% to 50% in the transverse direction.

16. The multilayer film according to claim 12, wherein the film has a shrink value, at 185° F. of from about 28% to 40%, in the machine direction and the transverse direction.

17. The multilayer film according to claim 15, wherein a ratio of a thickness of said orientation-compatible layer to the thickness of said barrier layer is at least about 5, and said orientation ratio is from about 9 to 20.

18. The multilayer film according to claim 17, wherein said ratio of said thickness of said orientation-compatible layer to said thickness of said barrier layer is from about 5 to 25, and said orientation ratio is from about 9 to 15.

19. The multilayer film according to claim 15, wherein said orientation-compatible polymeric layer has a modulus of from about $4 \times 10^4$ psi to $20 \times 10^5$ psi., and a ratio of a thickness of said orientation-compatible layer to the thickness of said barrier layer is from about 6 to 11, and said orientation ratio is from about 9 to 15.

20. The multilayer film according to claim 15, wherein said EVOH polymer comprises from about 38 weight percent to 48 weight percent ethylene, and said orientation-compatible polymeric layer has a modulus of from about $4 \times 10^4$ psi to $20 \times 10^4$ psi., and a ratio of a thickness of said orientation-compatible layer to the thickness of said barrier layer is from about 6 to 11, and said orientation ratio is from about 9 to 15.

21. An oriented multilayer film, comprising:

(A) a barrier layer having a thickness of from about 0.01 to 0.75 mils, said barrier layer comprising EVOH having an ethylene content of from about 34 to 60 weight percent;

(B) at least one polymeric layer having a modulus of at least about $4 \times 10^4$ psi;

wherein said multilayer film has:

an orientation ratio of at least 9 at a temperature of from about 165° F. to 212° F. and an oxygen permeability at 0% relative humidity of from about 0.1 and 6 $cm^3$-mil/day-$m^2$-atm;

a total thickness of said at least one polymeric layer is from about 0.49 to 4.5 mils; and wherein the barrier layer occupies from about 2–15 volume percent of the oriented multilayer film, and the multilayer film has a thickness of from about 0.5–5 mils.

22. The oriented multilayer film according to claim 21, wherein the at least one polymeric layer having a modulus of at least about $4 \times 10^4$ comprises at least one member selected from the group consisting of polyamide homopolymer, polyamide copolymer, polyester homopolymer, polyester copolymer, anhydride grafted linear low density polyethylene, maleic anhydride grafted ethylene vinyl acetate copolymer, and homogeneous ethylene alpha-olefin copolymer.

23. The oriented multilayer film according to claim 1, wherein the at least one polymeric layer having a modulus of at least about $4 \times 10^4$ comprises at least one member selected from the group consisting of polyamide homopolymer, polyamide copolymer, polyester homopolymer, polyester copolymer, anhydride grafted linear low density polyethylene, maleic anhydride grafted ethylene vinyl acetate copolymer, and homogeneous ethylene alpha-olefin copolymer.

* * * * *